(12) United States Patent
Kashihara et al.

(10) Patent No.: US 9,219,434 B2
(45) Date of Patent: Dec. 22, 2015

(54) MOTOR CONTROL DEVICE AND MOTOR CONTROL PROGRAM

(71) Applicant: SANDEN CORPORATION, Isesaki-shi (JP)

(72) Inventors: Tatsuki Kashihara, Isesaki (JP); Hiroshi Yoshida, Isesaki (JP); Kouji Kobayashi, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 14/381,536

(22) PCT Filed: Feb. 21, 2013

(86) PCT No.: PCT/JP2013/054325
§ 371 (c)(1),
(2) Date: Aug. 27, 2014

(87) PCT Pub. No.: WO2013/129230
PCT Pub. Date: Sep. 6, 2013

(65) Prior Publication Data
US 2015/0002058 A1 Jan. 1, 2015

(30) Foreign Application Priority Data
Feb. 29, 2012 (JP) .................... 2012-043610

(51) Int. Cl.
*H02P 6/08* (2006.01)
*H02P 27/08* (2006.01)
*H02P 21/00* (2006.01)

(52) U.S. Cl.
CPC ............... *H02P 6/08* (2013.01); *H02P 27/085* (2013.01); *H02P 21/0089* (2013.01); *H02P 2201/09* (2013.01)

(58) Field of Classification Search
CPC . B60L 11/1803; B60L 15/007; B60L 15/025; B60L 15/20; B60L 1/003; B60L 2200/26; B60L 2220/14; B60L 2240/12; B60L 2240/34; B60L 2240/36; B60L 2240/421; B60L 2240/423; B60L 2240/527
USPC ............... 318/400.02, 400.13, 400.3, 400.33, 318/400.15, 400.17, 400.04; 324/76.11
See application file for complete search history.

(56) References Cited

U.S. PATENT DOCUMENTS 6,198,240 B1    3/2001 Notohara et al.
8,860,356 B2 *  10/2014 Yuuki et al. .................... 318/718
(Continued)

FOREIGN PATENT DOCUMENTS

| JP | 06-105563 | 4/1994 |
| JP | 2000-078888 | 3/2000 |
| JP | 2003-33071 | 1/2003 |
| JP | 2003-199382 | 7/2003 |

(Continued)

*Primary Examiner* — Paul Ip
(74) *Attorney, Agent, or Firm* — Cozen O'Connor

(57) ABSTRACT

A motor control device according to the present invention includes: a boost converter circuit 30 that boosts a direct-current voltage; an inverter 40 that generates a drive pulse for a motor 50 from the direct-current voltage of the boost converter circuit 30; and a control section 60 that presets a set value Id_hold obtained by multiplying a set value Id_max by an intermediate current threshold coefficient α, controls a pulse width of the drive pulse of the inverter 40 based on a speed deviation, controls a d-axis current in the motor 50 based on the speed deviation so that the pulse width of the drive pulse of the inverter 40 does not exceed a threshold value, and controls the direct-current voltage of the boost converter circuit 30 based on the speed deviation so that the d-axis current in the motor 50 does not exceed the set value Id_hold.

6 Claims, 7 Drawing Sheets

(56) References Cited

U.S. PATENT DOCUMENTS

| | | | |
|---|---|---|---|
| 9,075,089 B2* | 7/2015 | Sakakibara | 1/1 |
| 2010/0201294 A1* | 8/2010 | Yuuki et al. | 318/400.3 |
| 2013/0181695 A1* | 7/2013 | Sakakibara | 324/76.11 |

FOREIGN PATENT DOCUMENTS

| | | |
|---|---|---|
| JP | 2003-250298 | 9/2003 |
| WO | WO 97/13318 | 4/1997 |

* cited by examiner

MOTOR CONTROL DEVICE AND MOTOR CONTROL PROGRAM

RELATED APPLICATIONS

This is a U.S. National stage of International application No. PCT/JP2013/054325 filed on Feb. 21, 2013.

This patent application claims the priority of Japanese application no. 2012-043610 filed Feb. 29, 2012 the disclosure content of which is hereby incorporated by reference.

TECHNICAL FIELD

The present invention relates to motor control, specifically, control of a permanent magnet synchronous motor.

BACKGROUND ART

For control of a permanent magnet synchronous motor (PMSM), vector control in which a position of an N pole of the permanent magnet is a d-axis and a direction of a phase advanced by $\pi/2$ from the position is a q-axis, a d-axis component and a q-axis component of motor current are separately controlled is generally employed. Also, as permanent magnet synchronous motor control methods, PWM (pulse width modulation) control in which a pulse width (current conduction ratio or modulation factor) of an inverter is adjusted to control an output voltage and PAM (pulse amplitude modulation) control in which an output voltage itself of an inverter is controlled are known. Also, as a method for further increasing a rotation frequency from a state in which an output voltage of an inverter is maximum, voltage phase control (flux weakening control) in which a d-axis current is operated in a negative direction is known.

In order to provide highly-efficient motor control for a wide rotation range, techniques that perform motor control by means of a combination these control methods are known. As such conventional techniques, for example, motor drive devices that control a motor by means of PWM control at the time of a low output and controls the motor by means of PAM control after a conduction ratio instruction value for the PWM control reaches a maximum are known (see, for example, Patent Document 1). Also, as other conventional techniques, for example, motor control methods in which PWM control and PAM control are switched from each other according to a load on a motor and a commutation phase is controlled according to, e.g., a speed of the motor (see, for example, Patent Document 2).

PRIOR ART DOCUMENT

Patent Document

Patent Document 1: Japanese Patent Laid-Open No. 6-105563

Patent Document 2: Japanese Patent No. 3341826

SUMMARY OF THE INVENTION

Problems to be Solved by the Invention

In order to provide optimum motor control based on the respective characteristics of the aforementioned three types of control methods, it is desirable that the three types of control methods be optimally combined in a continuous manner and performed in a complementary and coordinated manner. However, the optimal control method combination differs depending on, e.g., the characteristics of the motor to be controlled and the characteristics of the load. Furthermore, in recent years, permanent magnet synchronous motors are diversified in characteristics and usage, there is an increasing need to select an optimal control method combination according to, e.g., the characteristics of the motor to be controlled and the characteristics of the load. However, conventional motor control devices need to be tuned by individually selecting a control method for each operating state according to, e.g., the characteristics of the motor and the characteristics of the load, and has difficulty in performing optimal control over an entire operation range.

The present invention has been made in view of such circumstances, and an object of the present invention is to provide a motor control device that can perform individual coordinated control in which PWM control, PAM control and voltage phase control are optimally combined in a continuous manner by means of mere parameter change according to, e.g., the characteristics of a motor.

Means for Solving the Problems

<First Aspect of the Present Invention>

A first aspect of the present invention provides a motor control device including: a booster circuit that boosts a direct-current voltage; an inverter that generates a drive pulse for a motor from the direct-current voltage output by the booster circuit; and a control section that controls the booster circuit and the inverter, in which the control section includes: means for presetting a modulation factor threshold value for the drive pulse output by the inverter, a maximum current threshold value for defining a maximum value of a d-axis current in the motor, and an intermediate current threshold value obtained by multiplying the maximum current threshold value by an intermediate current threshold coefficient $\alpha$ ($0 \leq \alpha \leq 1$); means for deriving a speed deviation between a rotation speed of the motor and a target rotation speed; means for controlling a modulation factor of the drive pulse output by the inverter, based on the speed deviation; means for controlling the d-axis current in the motor based on the speed deviation so that the modulation factor of the drive pulse output by the inverter does not exceed the modulation factor threshold value; and means for controlling the direct-current voltage output by the booster circuit based on the speed deviation so that the d-axis current in the motor does not exceed the intermediate current threshold value.

When the modulation factor of the drive pulse output by the inverter is less than the modulation factor threshold value, the modulation factor is controlled based on the speed deviation of the motor. Consequently, the motor control becomes PWM control-based control. Then, when the modulation factor of the drive pulse output by the inverter reaches the modulation factor threshold value, the d-axis current in the motor is controlled based on the speed deviation of the motor so that the modulation factor does not exceed the modulation factor threshold value. Consequently, the motor control transitions from the PWM control-based control to voltage phase control-based control. Furthermore, when the d-axis current in the motor reaches the intermediate current threshold value, the direct-current voltage output by the booster circuit is controlled based on the speed deviation of the motor so that the d-axis current does not exceed the intermediate current threshold value. Consequently, the motor control transitions from the voltage phase control-based control to PAM control-based control.

Here, the intermediate current threshold value is a threshold value preset by multiplying the maximum current threshold value for defining the maximum value of the d-axis current in the motor by the intermediate current threshold coefficient α (0≤α≤1). For example, if a value of the intermediate current threshold coefficient α is set to 0, the intermediate current threshold value becomes 0. Thus, when the modulation factor of the drive pulse output by the inverter reaches the modulation factor threshold value during PWM control-based control, the d-axis current in the motor has already reached the intermediate current threshold value. Accordingly, the motor control transitions from the PWM control-based control not to voltage phase control-based control but to PAM control-based control.

On the other hand, for example, if the value of the intermediate current threshold coefficient α is set to a value larger than 0, the intermediate current threshold value becomes a value larger than 0 in proportion to the intermediate current threshold coefficient α. In this case, as described above, the motor control transitions from the PWM control-based control to voltage phase control-based control and then transitions to PAM control-based control. A length of the voltage phase control-based control range can be adjusted by increasing/decreasing the value of the intermediate current threshold coefficient α.

In other words, according to the first aspect of the present invention, whether or not a voltage phase control-based control range is provided between a PWM control-based control range and a PAM control-based control range is set by setting whether or not the value of the intermediate current threshold coefficient α is set to a value larger than 0. A length of the voltage phase control-based control range can be adjusted by merely increasing/decreasing the value of the intermediate current threshold coefficient α. Consequently, the first aspect of the present invention enables provision of the operation and effect of being able to provide a motor control device that can perform individual coordinated control in which PWM control, PAM control and voltage phase control are optimally combined in a continuous manner by mere parameter change according to, e.g., the characteristics of the motor.

<Second Aspect of the Present Invention>

A second aspect of the present invention provides the aforementioned first aspect of the present invention in which the control section further includes: means for presetting a voltage threshold value for the direct-current voltage output by the booster circuit; and means for controlling, under the condition that the direct-current voltage output by the booster circuit reaches the voltage threshold value, the d-axis current in the motor based on the speed deviation so that the direct-current voltage does not exceed the voltage threshold value.

For example, if the value of the intermediate current threshold coefficient α is set to 1, the intermediate current threshold value becomes a value that is the same as the maximum current threshold value. Thus, when the motor control transitions to PAM control-based control, the d-axis current in the motor has already reached the maximum current threshold value, and the motor control does not transition from the PAM control-based control to voltage phase control-based control.

On the other hand, for example, if the value of the intermediate current threshold coefficient α is set to less than 1, the intermediate current threshold value becomes a value smaller than the maximum current threshold value in proportion to the intermediate current threshold coefficient α. Accordingly, in this case, when the direct-current voltage output by the booster circuit reaches the voltage threshold value, the motor control transitions from the PAM control-based control to voltage phase control-based control. Thus, the voltage phase control-based control continues until the d-axis current in the motor reaches the maximum current threshold value, and a length of that control range can be adjusted by increasing/decreasing the value of the intermediate current threshold coefficient α.

In other words, according to the second aspect of the present invention, whether or not a voltage phase control-based control range is provided in a control range on the high output side relative to a PAM control-based control range can be set by setting whether or not the value of the intermediate current threshold coefficient α is set to less than 1. Then, the length of the voltage phase control-based control can be adjusted by merely increasing/decreasing the value of the intermediate current threshold coefficient α.

<Third Aspect of the Present Invention>

A third aspect of the present invention provides the aforementioned second aspect of the present invention in which the control section further includes means for controlling, under the condition that the d-axis current in the motor reaches the maximum current threshold value, the modulation factor of the drive pulse output by the inverter based on the speed deviation so that the d-axis current does not exceed the maximum current threshold value.

For example, where the value of the intermediate current threshold coefficient α is set to 1, when the direct-current voltage output by the booster circuit reaches the voltage threshold value during PAM control-based control, the d-axis current in the motor has already reached the maximum current threshold value. Accordingly, in this case, when the direct-current voltage output by the booster circuit reaches the voltage threshold value during PAM control-based control, the motor control transitions from the PAM control-based control to PWM control-based control.

On the other hand, for example, where the value of the intermediate current threshold coefficient α is set to less than 1, when the direct-current voltage output by the booster circuit reaches the voltage threshold value during PAM control-based control, the motor control transitions from the PAM control-based control to voltage phase control-based control, and furthermore, when the d-axis current in the motor reaches the maximum current threshold value, the motor control transitions from the voltage phase control-based control to PWM control-based control.

<Fourth Aspect of the Present Invention>

A fourth aspect of the present invention provides a motor control program for making a computer perform control of a booster circuit and an inverter included in a motor control device, the booster circuit boosting a direct-current voltage, the inverter generating a drive pulse for a motor from the direct-current voltage output by the booster circuit, the motor control program making the computer perform the steps of: presetting a modulation factor threshold value for the drive pulse output by the inverter, a maximum current threshold value for defining a maximum value of a d-axis current in the motor, and an intermediate current threshold value obtained by multiplying the maximum current threshold value by an intermediate current threshold coefficient α (0≤α≤1); deriving a speed deviation between a rotation speed of the motor and a target rotation speed; controlling a modulation factor of the drive pulse output by the inverter, based on the speed deviation; controlling the d-axis current in the motor based on the speed deviation so that the modulation factor of the drive pulse output by the inverter does not exceed the modulation factor threshold value; and controlling the direct-current voltage output by the booster circuit based on the speed deviation so that the d-axis current in the motor does not exceed the intermediate current threshold value.

The fourth aspect of the present invention provides an operation and effect that are similar to those of the aforementioned first aspect of the present invention in a motor control device including a computer that can execute the motor control program.

<Fifth Aspect of the Present Invention>

A fifth aspect of the present invention provides the fourth aspect of the present invention further making the computer perform the steps of: presetting a voltage threshold value for the direct-current voltage output by the booster circuit; and controlling, under the condition that the direct-current voltage output by the booster circuit reaches the voltage threshold value, the d-axis current in the motor based on the speed deviation so that the direct-current voltage does not exceed the voltage threshold value.

The fifth aspect of the present invention provides an operation and effect that are similar to those of the aforementioned second aspect of the present invention in a motor control device including a computer that can execute the motor control program.

<Sixth Aspect of the Present Invention>

A sixth aspect of the present invention provides the aforementioned fifth aspect of the present invention further making the computer perform the step of controlling, under the condition that the d-axis current in the motor reaches the maximum current threshold value, the modulation factor of the drive pulse output by the inverter based on the speed deviation so that the d-axis current does not exceed the maximum current threshold value.

The sixth aspect of the present invention provides an operation and effect that are similar to those of the aforementioned third aspect of the present invention in a motor control device including a computer that can execute the motor control program.

Advantageous Effects of the Invention

The present invention enables provision of a motor control device that can perform individual coordinated control in which PWM control, PAM control and voltage phase control are optimally combined in a continuous manner by means of mere parameter change according to, e.g., characteristics of the motor.

MODE FOR CARRYING OUT THE INVENTION

An embodiment of the present invention will be described below with reference to the drawings.

<Overall Configuration>

An overall configuration of a motor control device according to the present invention will be described below with reference to FIG. 1.

Figure 1:
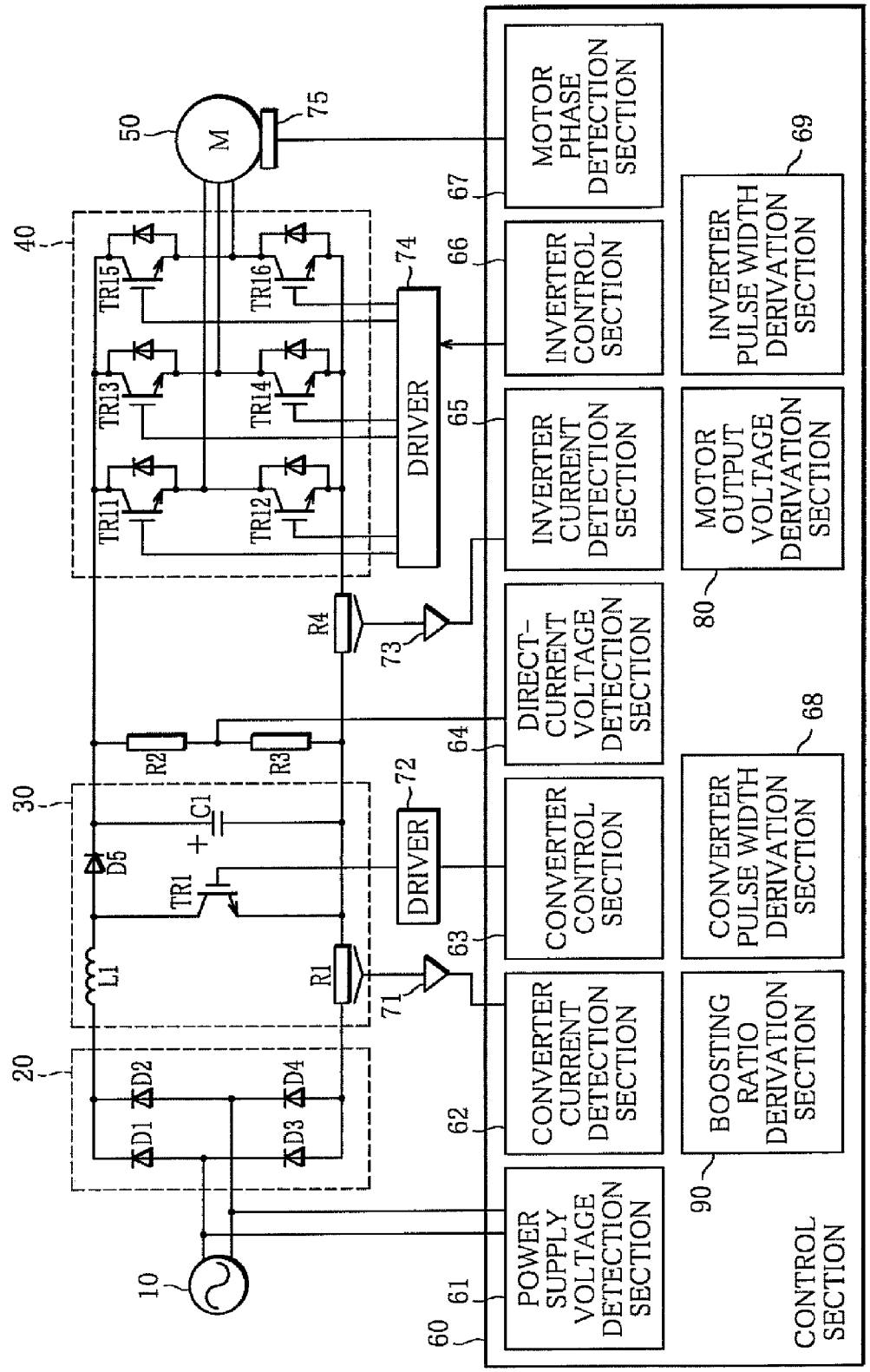
FIG. 1 is a diagram of an overall configuration of a motor control device according to the present invention.

FIG. 1 is a diagram of an overall configuration of a motor control device according to the present invention.

A motor 50 controlled by the motor control device according to the present invention is a permanent magnet synchronous motor. The motor control device according to the present invention includes a rectifier circuit 20, a boost converter circuit 30, an inverter 40 and a control section 60.

The rectifier circuit 20, which includes rectifier diodes D1 to D4, rectifies an alternate-current voltage output by a single-phase alternate-current power supply 10 to convert the alternate-current voltage to a direct-current voltage.

The boost converter circuit 30, which is a "booster circuit", is a circuit that boosts the direct-current voltage rectified by the rectifier circuit 20, and includes a coil L1, a transistor TR1, a diode D5 and a capacitor C1. The boost converter circuit 30 is a circuit in which when the transistor TR1 is on, energy is accumulated in the coil L1, and when the transistor TR1 is off, an input voltage and energy in the coil L1 are added up and transmitted to the output side, enabling provision of an output voltage higher than the input voltage.

The transistor TR1 is driven by a driver 72, and the driver 72 is controlled by a later-described converter control section 63. A resistor R1 is a shunt resistor for detecting a current flowing in the boost converter circuit 30. An amplifier 71 amplifies a voltage between terminals of the resistor R1 and outputs the amplified voltage to a later-described converter current detection section 62. Resistors R2 and R3 form a voltage dividing circuit for detecting an output voltage of the boost converter circuit 30. A voltage at a point of connection between the resistor R2 and the resistor R3 is detected by a later-described direct-current voltage detection section 64.

The inverter 40 is a circuit that generates a drive pulse for the motor 50 from a direct-current voltage output by the boost converter circuit 30, and includes transistors TR11 to TR16. More specifically, the inverter 40 is a circuit in which switching of each of the transistors TR11 to TR16 is controlled individually to convert a direct-current voltage output by the boost converter circuit 30 to a three-phase alternate-current drive pulse. The transistors TR11 to TR16 are driven by the driver 74, and the driver 74 is controlled by a later-described inverter control section 66. The resistor R4 is a shunt resistor for detecting a current flowing in the inverter 40. The amplifier 73 amplifies a voltage between terminals of the resistor R4 and outputs the amplified voltage to a later-described inverter current detection section 65.

The control section 60 is a microcomputer control circuit in which upon execution of a motor control program by a computer, exerts a function that controls the boost converter circuit 30 and the inverter 40. The control section 60 includes, as functional blocks provided by the motor control program, a power supply voltage detection section 61, the converter current detection section 62, the converter control section 63, the direct-current voltage detection section 64, the inverter current detection section 65, the inverter control section 66, a motor phase detection section 67, a converter pulse width derivation section 68, an inverter pulse width derivation section 69, a motor output voltage derivation section 80 and a boosting ratio derivation section 90.

The power supply voltage detection section 61 detects a voltage of the single-phase alternate-current power supply 10. The converter current detection section 62 detects a value of a current flowing in the boost converter circuit 30 from a voltage between the terminals of the resistor R1. The converter control section 63 adjusts a switching pulse width of the transistor TR1, thereby controlling an output voltage of the boost converter circuit 30 (PAM control). The direct-current voltage detection section 64 detects the output voltage of the boost converter circuit 30 from a voltage at the point of connection between the resistor R2 and the resistor R3. The inverter current detection section 65 detects a value of a current flowing in the inverter 40 from a voltage between the terminals of the resistor R4. The inverter control section 66 adjusts switching pulse widths of the transistors TR11 to TR16, thereby controlling a pulse width of a drive pulse output by the inverter 40, based on a speed deviation of the motor 50 (PWM control). The motor phase detection section 67 detects a phase of the motor 50 from an output signal from a phase detector 75 for the motor 50.

The converter pulse width derivation section 68 derives a switching pulse width of the transistor TR1 from a boosting ratio derived from the boosting ratio derivation section 90. The converter control section 63 outputs a control signal for the switching pulse width derived by the converter pulse width derivation section 68 to the driver 72.

The inverter pulse width derivation section 69 derives the switching pulse widths of the transistors TR11 to TR16 from an output voltage Vm derived by the motor output voltage derivation section 80. The inverter control section 66 outputs control signals for the switching pulse widths derived by the inverter pulse width derivation section 69 to the driver 74.

<Motor Control>

Motor control performed by the control section 60 will be described with reference to FIGS. 2 to 5.

Figure 2:
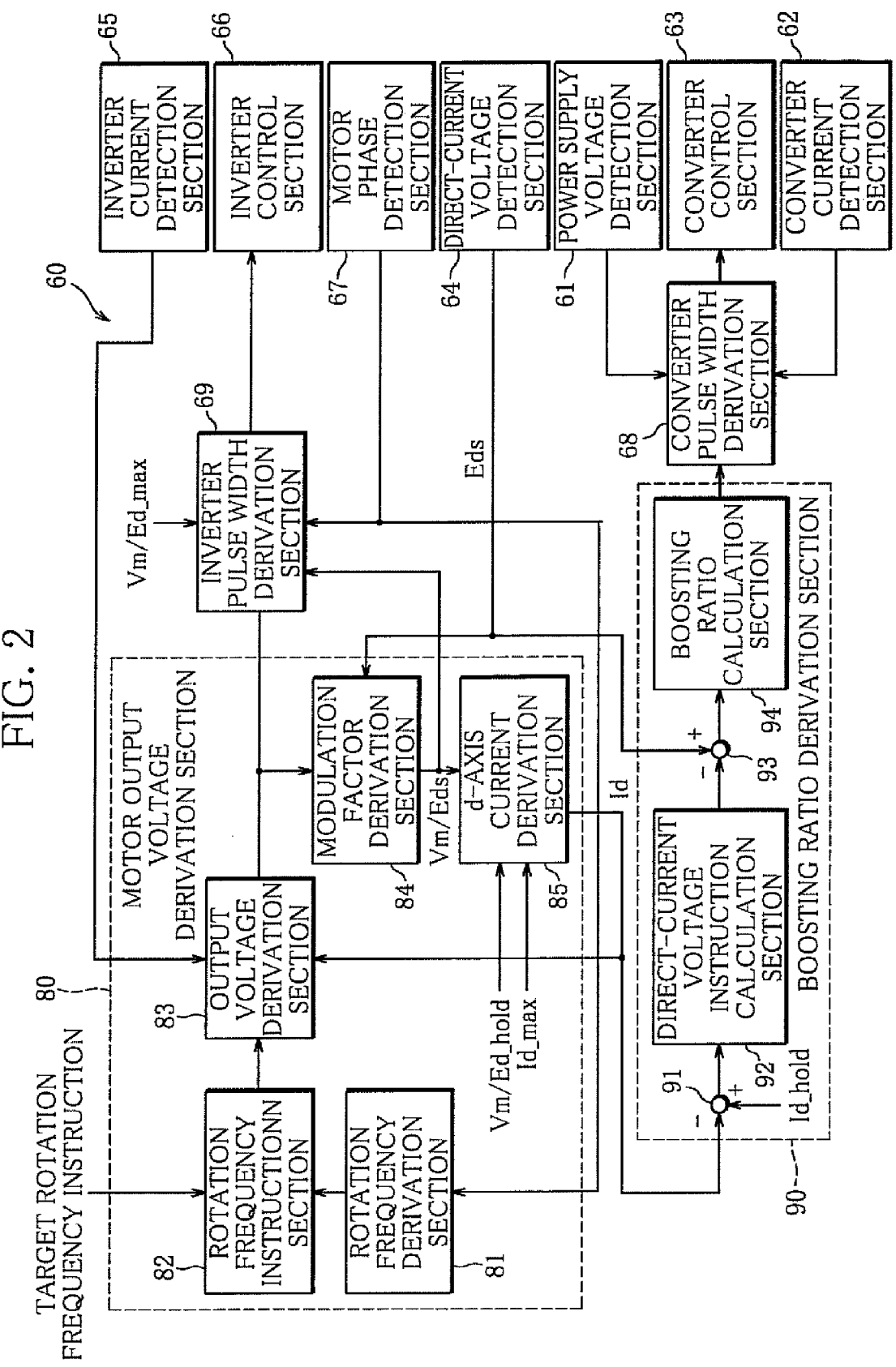
FIG. 2 is a functional block diagram of a control section.
Figure 3:
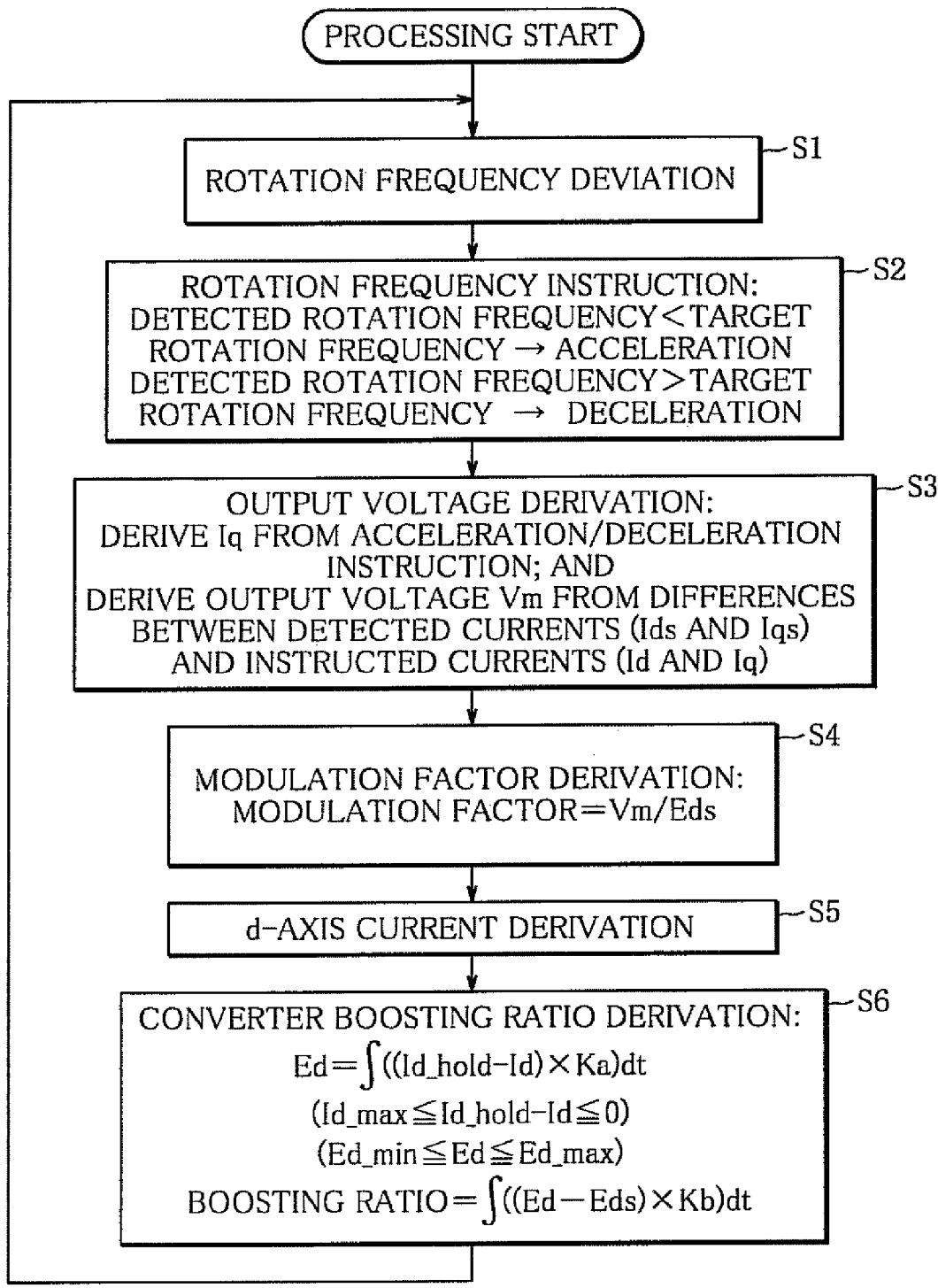
FIG. 3 is a flowchart illustrating a motor control procedure.
Figure 4:
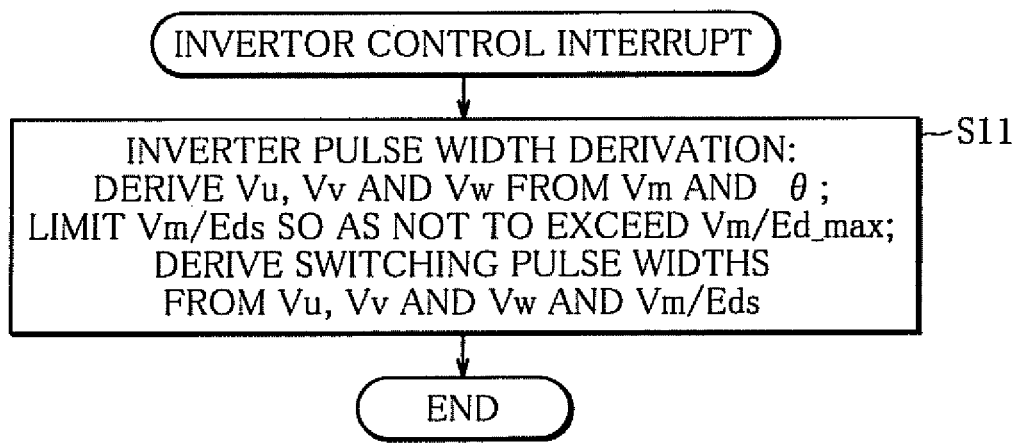
FIG. 4 is a flowchart illustrating inverter pulse width derivation procedure.
Figure 5:
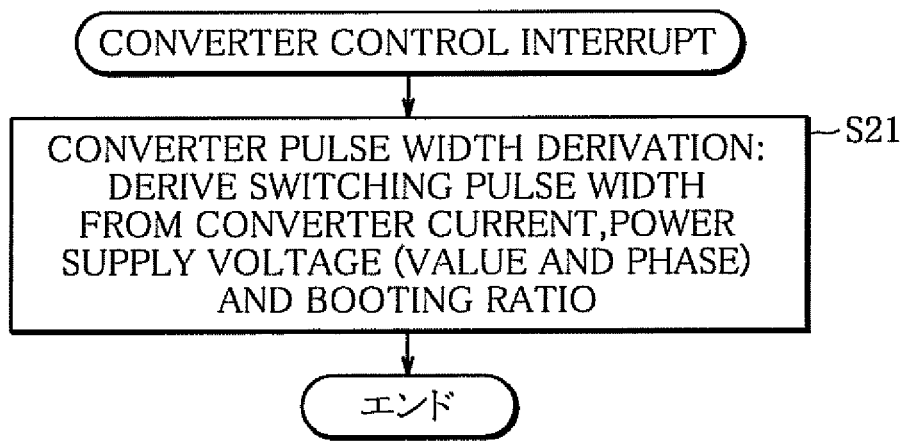
FIG. 5 is a flowchart illustrating a converter pulse width derivation procedure.

FIG. 2 is a functional block diagram of the control section 60. FIG. 3 is a flowchart illustrating a motor control procedure. FIG. 4 is a flowchart illustrating an inverter pulse width derivation procedure. FIG. 5 is a flowchart illustrating a converter pulse width derivation procedure.

The motor output voltage derivation section 80 includes a rotation frequency derivation section 81, a rotation frequency instruction section 82, an output voltage derivation section 83, a modulation factor derivation section 84 and a d-axis current derivation section 85.

The rotation frequency derivation section 81 derives a rotation frequency of the motor 50 from a phase of the motor 50 output by the motor phase detection section 67 (step S1 in FIG. 3). More specifically, the rotation frequency derivation section 81 derives a speed deviation between a rotation speed of the motor 50 and a target rotation speed.

The rotation frequency instruction section 82 derives an acceleration/deceleration instruction from the rotation frequency of the motor 50 output by the rotation frequency derivation section 81 and a target rotation frequency instruction (step S2 in FIG. 3). More specifically, the rotation frequency instruction section 82 outputs an acceleration instruction if the rotation frequency derived by the rotation frequency derivation section 81 is smaller than the target rotation frequency, and outputs a deceleration instruction if the rotation frequency derived by the rotation frequency derivation section 81 is larger than the target rotation frequency.

The output voltage derivation section 83 derives the output voltage Vm from the acceleration/deceleration instruction output by the rotation frequency instruction section 82, a detected d-axis current Ids and a detected torque current Iqs detected by the inverter current detection section 65, and an instructed d-axis current Id derived by the d-axis current derivation section 85 (step S3 in FIG. 3). More specifically, the output voltage derivation section 83 derives an instructed torque current Iq based on the acceleration/deceleration instruction, and derives the output voltage Vm from a difference between the detected d-axis current Ids and the instructed d-axis current Id and a difference between the detected torque current Iqs and the instructed torque current Iq.

The modulation factor derivation section 84 derives a modulation factor Vm/Eds from the output voltage Vm derived by the output voltage derivation section 83 and a detected direct-current voltage Eds detected by the direct-current voltage detection section 64 (step S4 in FIG. 3). More specifically, the modulation factor derivation section 84 derives a modulation factor Vm/Eds by dividing the output voltage Vm by the detected direct-current voltage Eds.

The d-axis current derivation section 85 controls the instructed d-axis current Id based on the speed deviation of the motor 50 so that a pulse width of a drive pulse output by the inverter 40 does not exceed a set value Vm/Ed_hold. Also, under the condition that a direct-current voltage output by the boost converter circuit 30 reaches a set value Ed_max (which will be described later), the d-axis current derivation section 85 controls the instructed d-axis current Id based on the speed deviation of the motor 50 so that the direct-current voltage does not exceed the set value Ed_max. Furthermore, under the condition that the instructed d-axis current Id reaches a set value Id_max, the d-axis current derivation section 85 controls the instructed d-axis current Id so that the instructed d-axis current Id does not exceed the set value Id_max.

More specifically, the d-axis current derivation section 85 derives the instructed d-axis current Id from the modulation factor Vm/Eds derived by the modulation factor derivation section 84, the set value Vm/Ed_hold and the set value Id_max (step S5 in FIG. 3). Here, the set value Vm/Ed_hold is a "modulation factor threshold value" for the drive pulse output by the inverter 40. The set value Id_max is a "maximum current threshold value" for defining a maximum value of the d-axis current in the motor 50. The set value Vm/Ed_hold and the set value Id_max are, for example, stored in advance in, e.g., a memory medium (not illustrated) in the control section 60.

Upon an inverter control interrupt, the inverter pulse width derivation section 69 first derives voltages Vu, Vv and Vw applied to the motor 50 from the output voltage Vm derived by the output voltage derivation section 83 and the phase θ of the motor 50 output by the motor phase detection section 67. Next, the inverter pulse width derivation section 69 limits the modulation factor Vm/Eds derived by the modulation factor derivation section 84 to a range not exceeding the set value Vm/Ed_max. Here, the set value Vm/Ed_max is a set value for defining the maximum value of the pulse width (modulation factor Vm/Eds) of the drive pulse output by the inverter 40, and is, for example, stored in advance in, e.g., the memory medium (not illustrated) in the control section 60. Then, the inverter pulse width derivation section 69 derives the switching pulse widths of the transistors TR11 to TR16 in the inverter 40 from the modulation factor Vm/Eds and the applied voltages Vu, Vv and Vw (step S11 in FIG. 4).

The boosting ratio derivation section 90 controls a boosting ratio for the boost converter circuit 30 based on the speed deviation of the motor 50 so that the instructed d-axis current Id does not exceed the set value Id_hold. The boosting ratio derivation section 90 includes a first subtractor 91, a direct-current voltage instruction calculation section 92, a second subtractor 93 and a boosting ratio calculation section 94.

The first subtractor 91 subtracts the instructed d-axis current Id from the set value Id_hold. The direct-current voltage instruction calculation section 92 derives an instructed direct-current voltage Ed from Expression (1) below while limiting a range of a subtraction value output by the first subtractor 91 so as to have a minimum value of 0 and a maximum value of the set value Id_max (step S6 in FIG. 3).

[Expression 1]

$$Ed = \int((Id\_hold - Id) \times Ka)dt \quad (1)$$

Here, the set value Id_hold is an "intermediate current threshold value" obtained by multiplexing the set value Id_max by an intermediate current threshold coefficient α. The intermediate current threshold coefficient α is set to an arbitrary value in a range of no less than 0 and no more than 1. A constant. Ka is a proportional gain. The set value Id_hold and the intermediate current threshold coefficient α are, for example, stored in advance in, e.g., the memory medium (not illustrated) in the control section 60.

Also, the direct-current voltage instruction calculation section 92 limits the range of the instructed direct-current voltage Ed so as to have a minimum value of a set value Ed_min and a maximum value of a set value Ed_max (step S6 in FIG. 3). Here, the set value Ed_min is a set value for defining a minimum value of the direct-current voltage output by the boost converter circuit 30. The set value Ed_max as a "voltage threshold value" is a set value for defining a maximum value of the direct-current voltage output by the boost converter circuit 30. The set value Ed_min and the set value Ed_max are, for example, stored in, e.g., the memory medium (not illustrated) in the control section 60.

The second subtractor 93 subtracts the instructed direct-current voltage Ed from the detected direct-current voltage Eds. The boosting ratio calculation section 94 derives a boosting ratio from Expression (2) below (step S6 in FIG. 3).

[Expression 2]

$$\text{Boosting ratio} = \int((Ed - Eds) \times Kb)dt \quad (2)$$

Here, the constant Kb is a proportional gain.

Upon converter control interrupt, the converter pulse width derivation section 68 derives the switching pulse width of the transistor TR1 in the boost converter circuit 30 from a power supply voltage (value and phase) output by the power supply voltage detection section 61, a converter current output by the converter current detection section 62 and the boosting ratio derived by the boosting ratio derivation section 90 (step S21 in FIG. 5).

A description will be provided below taking a control state where the rotation frequency and a load torque of the motor 50 are increasing, as an example. First, motor control where the intermediate current threshold coefficient α is set to a value that is larger than 0 and smaller than 1 will be described with reference to FIG. 6.

Figure 6:
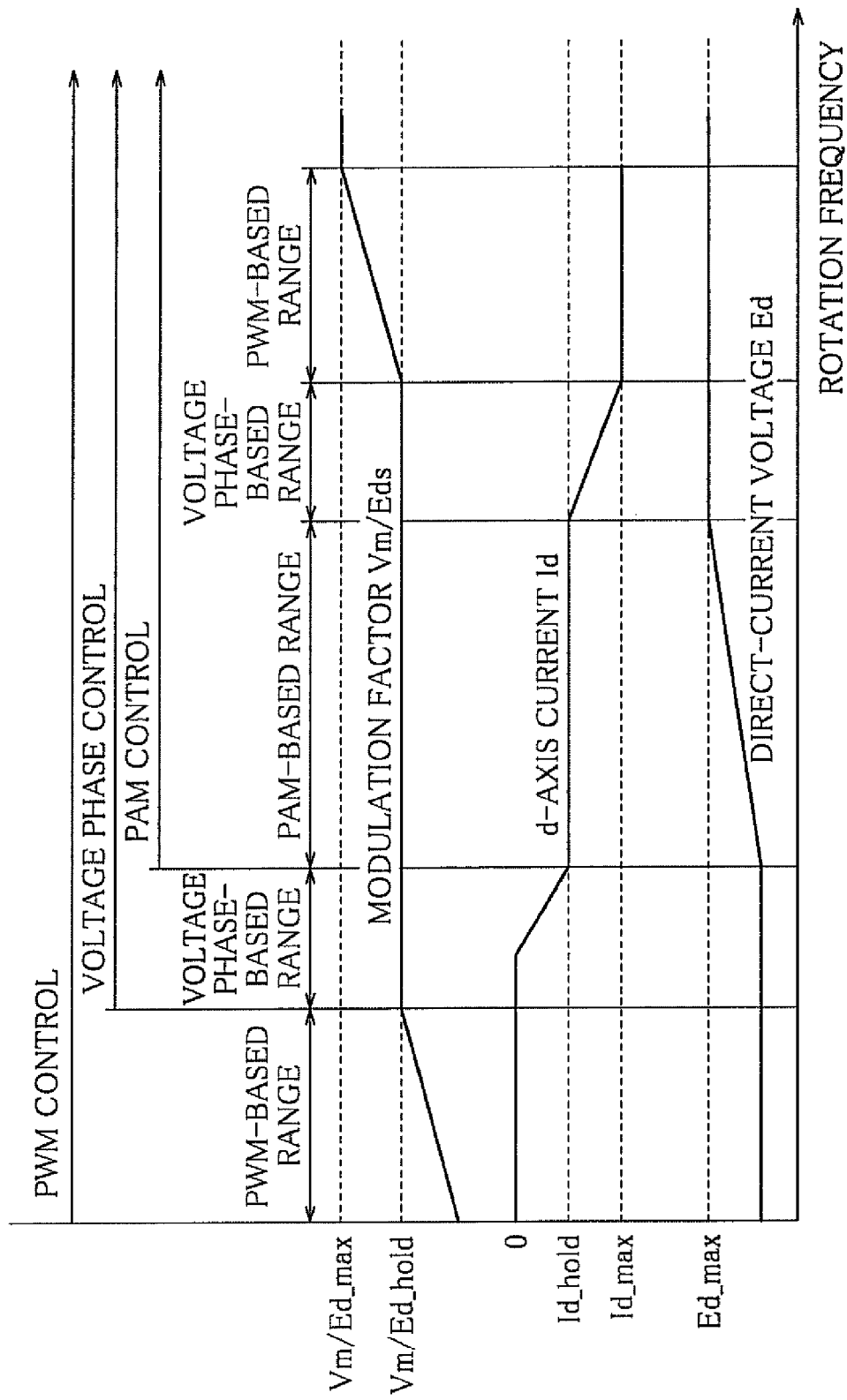
FIG. 6 is a timing chart illustrating motor control where $0<\alpha<1$.

FIG. 6 illustrates a control state when the rotation frequency and the load torque of the motor 50 are increasing, and is a timing chart illustrating motor control where 0<α<1.

As described above, the d-axis current derivation section 85 controls the instructed d-axis current Id based on the speed deviation of the motor 50 so that the pulse width of the drive pulse output by the inverter 40 does not exceed the set value Vm/Ed_hold. Therefore, when the pulse width of the drive pulse output by the inverter 40 is less than the set value Vm/Ed_hold, PWM control-based control in which the pulse width of the drive pulse output by the inverter 40 is controlled based on the speed deviation of the motor 50 is performed. Then, when the pulse width of the drive pulse output by the inverter 40 reaches the set value Vm/Ed_hold, the instructed d-axis current Id is controlled based on the speed deviation of the motor 50 so that the pulse width does not exceed the set value Vm/Ed_hold. Consequently, the motor control transitions from the PWM control-based control to voltage phase control-based control. A length of the voltage phase control-based control range can be adjusted by increasing/decreasing the value of the intermediate current threshold coefficient α.

Also, as described above, the boosting ratio derivation section 90 controls the boosting ratio in the boost converter circuit 30 based on the speed deviation of the motor 50 so that the instructed d-axis current Id does not exceed the set value Id_hold. Therefore, when the instructed d-axis current Id reaches the set value Id_hold, the motor control transitions from the voltage phase control-based control to PAM control-based control.

Also, as described above, under the condition that the direct-current voltage output by the boost converter circuit 30 reaches the set value Ed_max, the d-axis current derivation section 85 controls the instructed d-axis current Id based on the speed deviation of the motor 50 so that the direct-current voltage does not exceed the set value Ed_max. Therefore, when the direct-current voltage output by the boost converter circuit 30 reaches the set value Ed_max, the motor control transitions from the PAM control-based control to voltage phase control-based control.

Also, as described above, under the condition that the instructed d-axis current Id reaches the set value Id_max, the d-axis current derivation section 85 controls the instructed d-axis current Id so that the instructed d-axis current Id does not exceed the set value Id_max. Therefore, the voltage phase control-based control continues until the instructed d-axis current Id reaches the set value Id_max, and a length of that control range can be adjusted by increasing/decreasing the value of the intermediate current threshold coefficient α.

When the instructed d-axis current Id reaches the set value Id_max, the motor control transitions from the voltage phase control-based control to PWM control-based control. Then, as described above, the inverter pulse width derivation section 69 limits the modulation factor Vm/Eds derived by the modulation factor derivation section 84 to a range not exceeding the set value Vm/Ed_max, and then derives the switching pulse widths of the transistors TR11 to TR16 of the inverter 40 from the modulation factor Vm/Eds and the applied voltages Vu, Vv and Vw. Accordingly, the PWM control-based control continues until the modulation factor Vm/Eds reaches the set value Vm/Ed_max.

Next, motor control where the intermediate current threshold coefficient α is set to 0 will be described with reference to FIG. 7.

Figure 7:
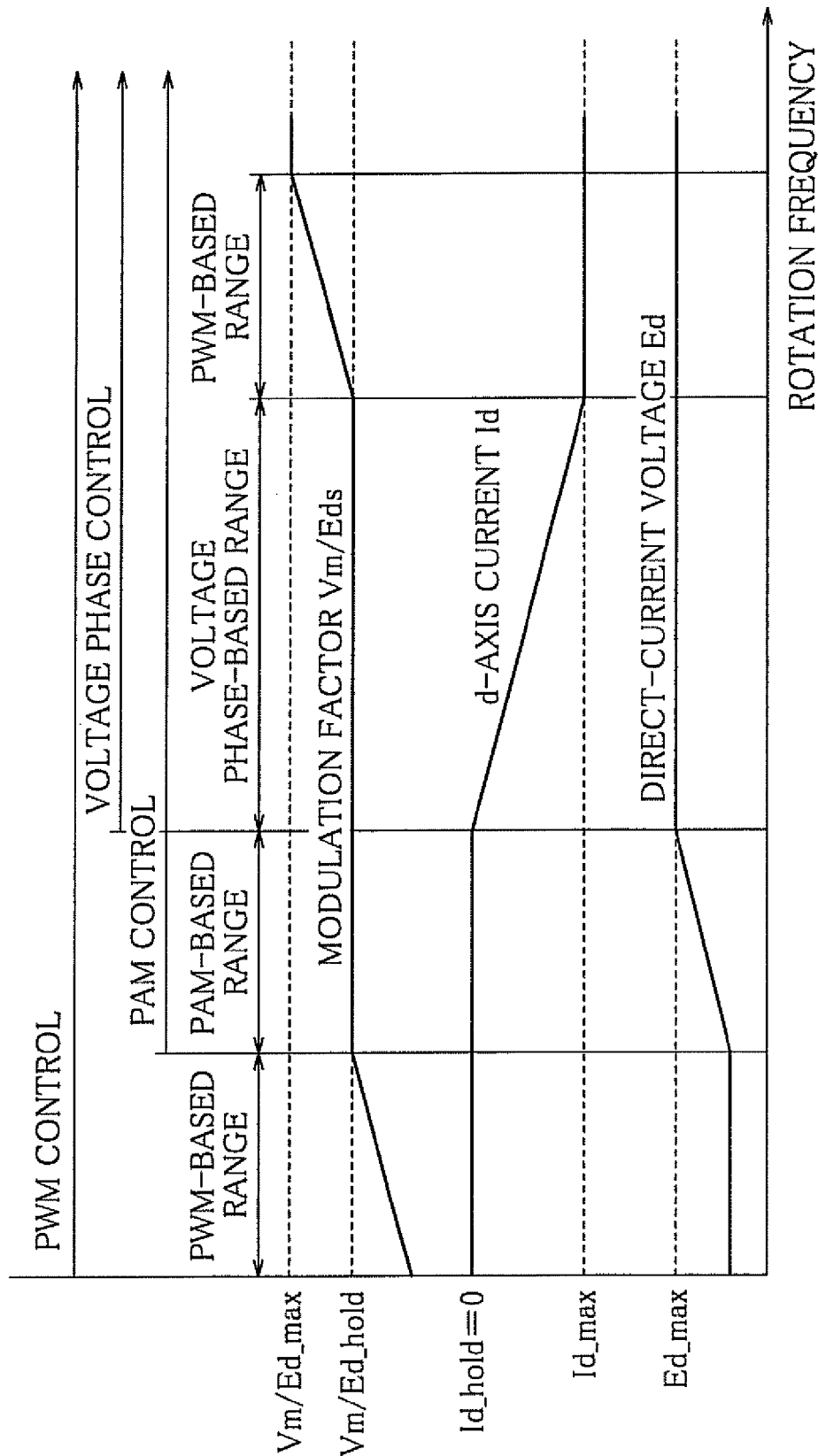
FIG. 7 is a timing chart illustrating motor control where $\alpha=0$.

FIG. 7 illustrates a control state where the rotation frequency and the load torque of the motor 50 are increasing, and is a timing chart illustrating motor control where α=0.

Where the intermediate current threshold coefficient α is set to 0, the set value Id_hold becomes 0. Thus, when the modulation factor Vm/Eds reaches the set value Vm/Ed_hold during PWM control-based control, the instructed d-axis current Id has already reached the set value Id_hold. Accordingly, where the intermediate current threshold coefficient α is set to 0, the motor control transitions from the PWM control-based control not to voltage phase control-based control, but to PAM control-based control (FIG. 7). The subsequent control is similar to the above-described control where 0<α<1 (FIG. 6).

Next, motor control where the intermediate current threshold coefficient α is set to 1 will be described with reference to FIG. 8.

Figure 8:
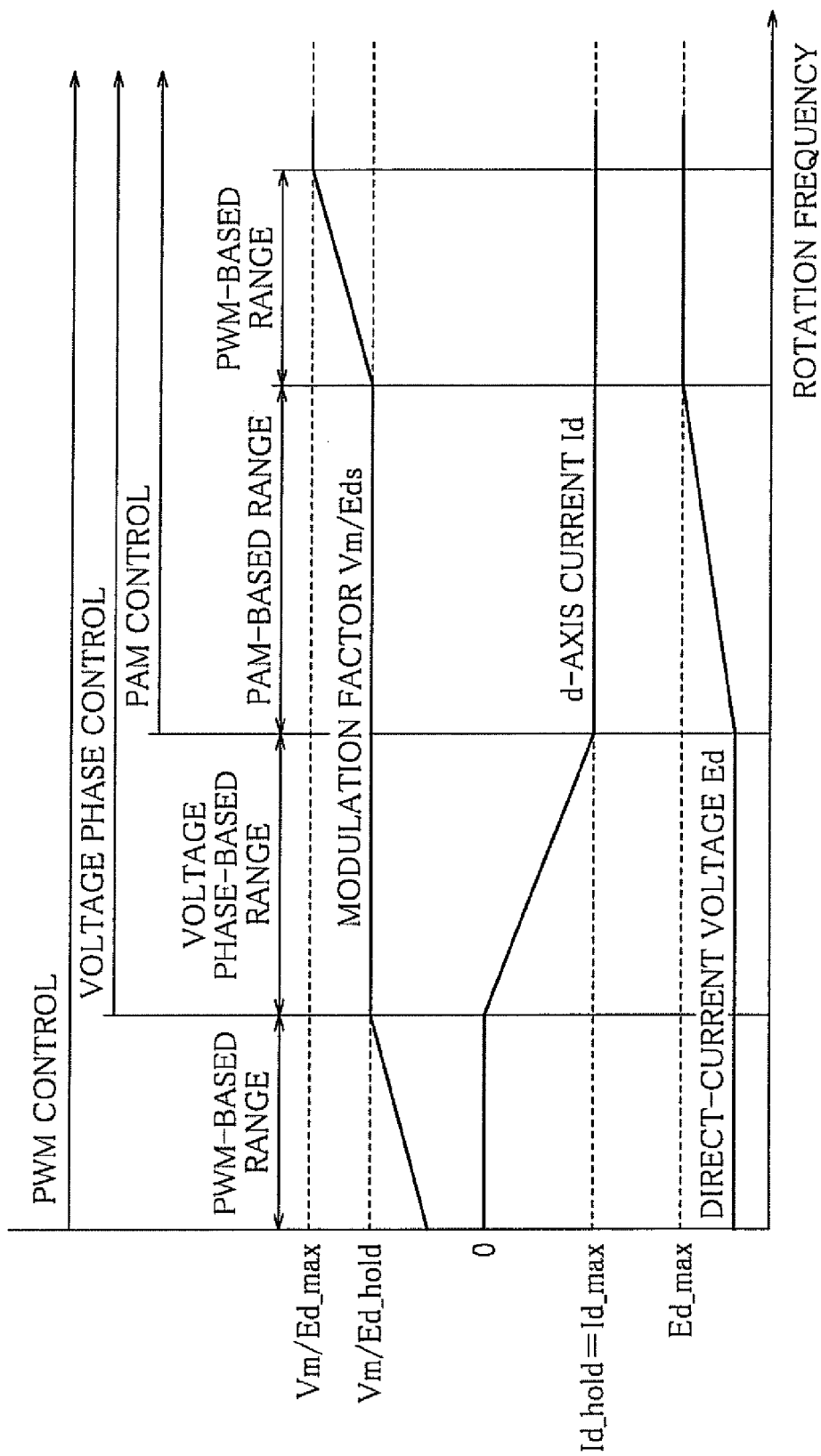
FIG. 8 is a timing chart illustrating motor control where $\alpha=1$.

FIG. 8 illustrates a control state where the rotation frequency and the load torque of the motor 50 are increasing, and is a timing chart illustrating motor control where α=1.

Where the intermediate current threshold coefficient α is set to 1, the set value Id_hold becomes a value that is the same as the set value Id_max. Thus, when the motor control transitions to PAM control-based control, the instructed d-axis current Id has already reached the set value Id_max. Accordingly, the motor control does not transition from the PAM control-based control to voltage phase control-based control, but from the PAM control-based control to PWM control-based control (FIG. 8).

As described above, in a motor control device according to the present invention, whether or not a voltage phase control-based control range is provided between a PWM control-based control range and a PAM control-based control range (control range on the low output side relative to the PAM control-based control range) can be set by setting whether or not the value of the intermediate current threshold coefficient α is set to a value larger than 0. Also, in a motor control device according to the present invention, whether or not a voltage phase control-based control range is provided in a control range on the high output side relative to a PAM control-based control range can be set by setting whether the value of the intermediate current threshold coefficient α is less than 1. Then, a length of the voltage phase control-based control range can be adjusted by merely increasing/decreasing the value of the intermediate current threshold coefficient α.

As described above, the present invention enables provision of a motor control device that enables individual coordinated control in which PWM control, PAM control and voltage phase control are optimally combined in a continuous manner to be performed by mere parameter change according to, e.g., the characteristics of the motor 50.

It should be understood that the present invention is not specifically limited to the above-described embodiment and various alterations are possible within the scope of the invention stated in the claims. Also, a motor control program that provides the above-described motor control and a memory medium with the program stored therein may also be subject matters of the present invention.

EXPLANATION OF REFERENCE SIGNS

10 single-phase alternate-current power supply
20 rectifier circuit
30 boost converter circuit
40 inverter
50 motor
60 control section
80 motor output voltage derivation section
81 rotation frequency derivation section
82 rotation frequency instruction section
83 output voltage derivation section
84 modulation factor derivation section
85 d-axis current derivation section
90 boosting ratio derivation section

The invention claimed is:

1. A motor control device comprising:
a booster circuit that boosts a direct-current voltage;
an inverter that generates a drive pulse for a motor from the direct-current voltage output by the booster circuit; and
a control section that controls the booster circuit and the inverter,
wherein the control section includes:
means for presetting a modulation factor threshold value for the drive pulse output by the inverter, a maximum current threshold value for defining a maximum value of a d-axis current in the motor, and an intermediate current threshold value obtained by multiplying the maximum current threshold value by an intermediate current threshold coefficient α ($0 \leq \alpha \leq 1$);
means for deriving a speed deviation between a rotation speed of the motor and a target rotation speed;
means for controlling a modulation factor of the drive pulse output by the inverter, based on the speed deviation;
means for controlling the d-axis current in the motor based on the speed deviation so that the modulation factor of the drive pulse output by the inverter does not exceed the modulation factor threshold value; and
means for controlling the direct-current voltage output by the booster circuit based on the speed deviation so that the d-axis current in the motor does not exceed the intermediate current threshold value.

2. The motor control device according to claim 1, wherein the control section further includes:
means for presetting a voltage threshold value for the direct-current voltage output by the booster circuit; and
means for controlling, under the condition that the direct-current voltage output by the booster circuit reaches the voltage threshold value, the d-axis current in the motor based on the speed deviation so that the direct-current voltage does not exceed the voltage threshold value.

3. The motor control device according to claim 2, wherein the control section further includes means for controlling, under the condition that the d-axis current in the motor reaches the maximum current threshold value, the modulation factor of the drive pulse output by the inverter based on the speed deviation so that the d-axis current does not exceed the maximum current threshold value.

4. A motor control program for making a computer perform control of a booster circuit and an inverter included in a motor control device, the booster circuit boosting a direct-current voltage, the inverter generating a drive pulse for a motor from the direct-current voltage output by the booster circuit, the motor control program making the computer perform the steps of:
presetting a modulation factor threshold value for the drive pulse output by the inverter, a maximum current threshold value for defining a maximum value of a d-axis current in the motor, and an intermediate current threshold value obtained by multiplying the maximum current threshold value by an intermediate current threshold coefficient α ($0 \leq \alpha \leq 1$);
deriving a speed deviation between a rotation speed of the motor and a target rotation speed;
controlling a modulation factor of the drive pulse output by the inverter, based on the speed deviation;
controlling the d-axis current in the motor based on the speed deviation so that the modulation factor of the drive pulse output by the inverter does not exceed the modulation factor threshold value; and
controlling the direct-current voltage output by the booster circuit based on the speed deviation so that the d-axis current in the motor does not exceed the intermediate current threshold value.

5. The motor control program according to claim 4, further making the computer perform the steps of:
presetting a voltage threshold value for the direct-current voltage output by the booster circuit; and
controlling, under the condition that the direct-current voltage output by the booster circuit reaches the voltage threshold value, the d-axis current in the motor based on the speed deviation so that the direct-current voltage does not exceed the voltage threshold value.

6. The motor control program according to claim 5, further making the computer perform the step of controlling, under the condition that the d-axis current in the motor reaches the maximum current threshold value, the modulation factor of the drive pulse output by the inverter based on the speed deviation so that the d-axis current does not exceed the maximum current threshold value.

* * * * *